United States Patent

Boin

[15] 3,641,336
[45] Feb. 8, 1972

[54] ELECTRIC LAMPS FOR EMERGENCY AND/OR FOR DUTY UNDER PARTICULAR ENVIRONMENT CONDITIONS, AND RELATIVE IMPROVED LAMPS

[72] Inventor: Giovanni Boin, Via Luosi 9, Milan, Italy
[22] Filed: Apr. 5, 1971
[21] Appl. No.: 130,826

Related U.S. Application Data

[63] Continuation of Ser. No. 725,872, May 1, 1968, abandoned.

[30] Foreign Application Priority Data

May 6, 1967 Italy ..........................................15,805

[52] U.S. Cl. ................................240/10.6 R, 320/2, 320/3, 320/4
[51] Int. Cl. ...........................F21l 7/00, F21l 9/00, F21l 11/00
[58] Field of Search ..............................................240/10.6 R; 320/2–4

[56] References Cited

UNITED STATES PATENTS

| | | | |
|---|---|---|---|
| 1,506,302 | 8/1924 | Hopkins | 240/10.6 R |
| 2,257,860 | 10/1941 | Talbot et al. | 240/10.6 R |
| 2,582,330 | 1/1952 | Hautala | 240/10.6 R |
| 3,277,358 | 10/1966 | Nicholl | 320/2 |
| 3,418,552 | 12/1968 | Holmes | 320/2 |

*Primary Examiner*—Samuel S. Matthews
*Assistant Examiner*—Richard A. Wintercorn

[57] ABSTRACT

An electric emergency lamp includes a self-contained power supply, comprising a rechargeable accumulator or battery, a first electric circuit connectable to an external power supply for battery recharge and a second electric circuit controllable from the outside to switch on the light source of the lamp. The lamp is designed to operate in environments and/or conditions requiring the observance of tight seals, the lack of connections capable of giving rise to sparking and the like, for which purpose the electric battery circuits are incorporated within a waterproof lamp casing and can be connected to an external AC supply by an electric magnetoinductively operating power transducer, the secondary winding of which is incorporated within the waterproof casing, whereas the primary winding can be brought close to the waterproof casing, so as to ensure the closure of the magnetic circuit between said primary and secondary windings.

4 Claims, 3 Drawing Figures

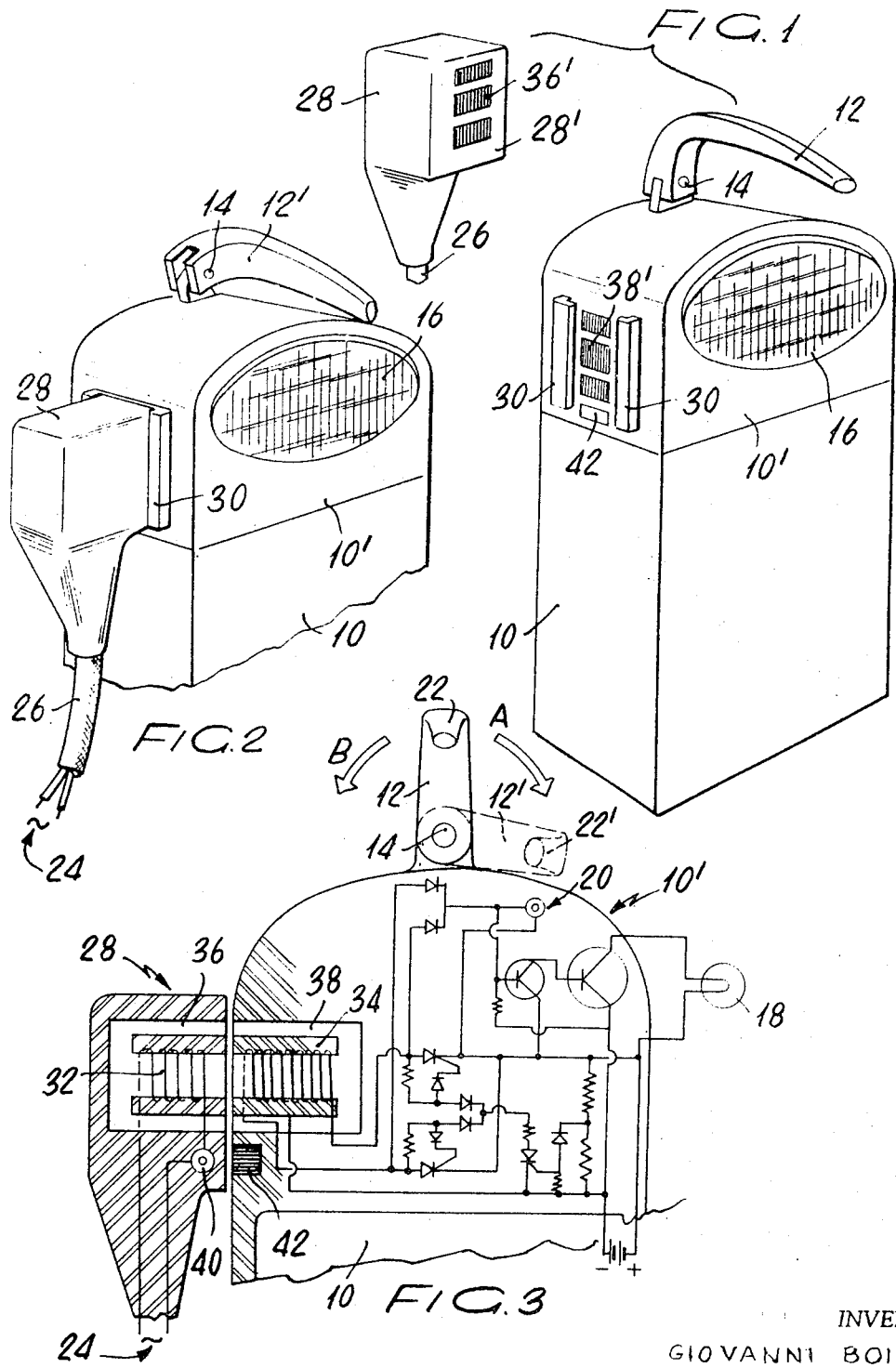

ELECTRIC LAMPS FOR EMERGENCY AND/OR FOR DUTY UNDER PARTICULAR ENVIRONMENT CONDITIONS, AND RELATIVE IMPROVED LAMPS

This invention relates to improvements in electric emergency lamps and similar electric devices, provided with a self-contained power supply, particularly an accumulator, and more particularly the present invention relates to emergency lamps and equivalent electrical apparatuses suitable to be used in environments exhibiting particular duty conditions, such as those requiring the use of strictly waterproof and/or flameproof apparatus, that is such as not to absolutely and even unusually give rise to such sparking phenomena as to cause a priming of explosive mixtures, combustible gases and the like. Therefore, the improved emergency lamps according to the invention are designed to be, for example, conveniently used in ships, mines, factories, warehouses or the like, the environment of which might be contaminated by combustible gases, chemical agents and the like.

Particularly, it is the object of this invention to provide emergency lamps and equivalent electrical apparatus, particularly of the moving type, of a waterproof construction and capable of association with an external power supply, particularly an AC local distributing main, for recharge and maintenance of the relative accumulator cell at normal constant use conditions, the connection between said external supply and accumulator cell, or more particularly the electric and electronic components for current transformation and rectification, being effected by components separable from one another and between which in any case there is no potential differential capable of giving rise to sparking phenomena.

It is also the object of this invention to provided emergency means, the electric and electronic components of which are entirely at a solid state and however at the most favorable resisting conditions against shocks and the most serious environmental and operating conditions.

It is another object of this invention to provide an emergency means of the above-stated type for automatically signalling and intervening in case of lack of power at the local supply network or main for the means of normal illumination, immediately substituting for the latter in such an event, and providing for a self-contained light source, separable from said means for its connection to main.

Finally, it is an object of this invention to provide an emergency means for the specified or equivalent uses, comprising switching devices for integrating the performances thereof and improving the duty conditions thereof, as entirely shielded from the external environment and operable through magnetic field application, so as to remove any discontinuity in the coatings or waterproof casings of the several components.

The accompanying drawing shows a preferred, but not exclusive embodiment, illustrating only those parts and components which are essential and peculiar to the invention, and particularly:

FIG. 1 is a perspective view of an emergency lamp, together with its connecting means to an external AC supply, at a separated position;

FIG. 2 is fragmentary view showing said lamp at its normal waiting and maintaining conditions of the accumulator cell to the required charge level; and FIG. 3 diagrammatically shows the essential components for the input, battery charge and ignition circuits.

Particularly referring to the figures in the drawing, the emergency lamp in the shown embodiment comprises, as proper structural parts thereof, a strictly waterproof box casing or container 10, preferably but not necessarily of a metal construction. Said casing is provided with a gripping handle 12, preferably swingable and settable by rotation about a pin 14, and acting as an operating member for switching on and off said lamp, as hereinafter described. On one face of casing head 10' an aperture is provided (tightly sealed by a suitable optical condenser 16 acting also as a suitable optical distributor), within the space of which the actual light source, as an assembled filament lamp 18 (FIG. 3), as well as the reflective surfaces and/or concentrating and condensing lens means prearranged for emitting the light beam at the desired conditions, are disposed. At the prevailing and lower section of casing 10 the accumulator battery is disposed, which battery is preferably of the nickel cadmium and stationary liquid type, and anyhow suitable for the duty conditions of said emergency means.

Within said head 10' of said casing there are arranged the electric and electronic solid state components for rectifying the alternate current for battery recharge and automatic control of the instantaneous conditions in charge level in order to assure operation thereof.

The circuit within said head 10' is schematically shown in FIG. 3 and realizable according to the present technical knowledge in electronic field, such components being suitably combined in accordance with the function logic as required in various operative cases.

Particularly, such circuits, as exemplified in said diagram, comprises a circuit controlling the switching on for lamp 18 and a circuit for battery recharge when its charge level drops below a predetermined minimum value. These circuits are capable of automatically providing the switching on of lamp 18 when the external supply is lacking in power, thus providing, in addition to the signal lack, for the immediate replacement of the normal illumination by that as provided by the emergency lamp.

According to a convenient additional characteristic of this improvement, the switching on of the lamp will depend on the operation of a known switch, designated at 20 in FIG. 3, having lamellar or bar contacts tightly sealed within a bulb (such switches being commonly referred to as "Reed"), said switching on occurring when said switch 20 is released from influence of a permanent magnet 22 accommodated within said handle 12, this influence appearing when said handle, set in direction (A) as shown at 12' in FIGS. 2 and 3, moves said magnet to a position 22' sufficiently adjacent said "Reed" 20, enclosed within the casing of head 10'. Such a technical approach will in any case provide for lamp switching on when said handle is lifted, as required for transportation thereof, the setting of said handle in the opposite direction (B) ensuring the switching on, even when said lamp is not manually carried or anyhow appended to said handle.

According to a peculiar feature of this improvement, when at its wait conditions, as laid down or hooked to a suitable support, the emergency lamp is connected to a local AC distributing network 24, such as by means of a flexible cord 26 terminating at a head 28 which may be hooked, such as by means of dovetail couplings 30, to a side or however an outer surface area of the casing, particularly the head 10' of the lamp.

This connection is provided by means of a magnetoinductive solid-state transducer comprising primary and secondary components bodily separated and jointly providing an electric transformer.

As particularly seen in FIG. 3, within head 28 or primary component the primary winding 32 is arranged and connected to cord 26 and hence network 24, while the second winding or component 34 is enclosed within the lamp head 10'.

Said primary and secondary windings 32 and 34, respectively, are wound about armature components 36 and 38, respectively, jointly suitable for ensuring the closure of the magnetic transformer circuit, when at the mutual opposing position, as shown in FIG. 3, and held by the proper coupling of head 28 to couplings 30, as shown in FIG. 2. Substantially, the armature components 36 and 38 would embody, when being at said relative position, a conventional stack of sheets or packing bodily divided into two parts according to a sectional plane coinciding with the opposite surfaces of the side for head 10' and face 28' for head 28, respectively. As seen from FIG. 1, on said surfaces there appear the faces 36' and 38' as a result of said armature sectioning. Such appearing faces are suitably smoothed, so as to ensure a close matching when head 28 is applied (FIGS. 2 and 3) in order to minimize the gaps jeopardizing the closure of the magnetic circuits.

According to a further additional feature of the invention, the inductor unit (32, 36) of said transducer, incorporated within said head 28, has its magnetic circuit open when said head is moved away from the lamp casing. In order to avoid a useless power dissipation at the primary section of the transducer, winding 32 is connected in series with a switch 40, still of the "Reed" type (FIG. 3), which is open when not biased by the field of a permanent magnet 42, located at the side of the lamp casing at a position suitable for exerting its magnetic bias on said "Reed" 40 when said head 28 is placed in situ. Alternatively, in place of "Reed" there could be a capacitor such as to form together with the series inductance of said primary winding 38 a LC circuit for limiting the current as absorbed by said primary winding upon separation of head 28, which would otherwise occur due to variation of primary winding 32. As the useful power or output at the secondary winding 34 will depend on the type of lamp which is desired to be carried out, obviously the above-mentioned capacitor has to be sized proportionally to the useful output, such as for a useful output of about 5 W. at the secondary winding a capacitor of about 1 uf. was used.

From the foregoing and from an observation of the appended figures, it will be apparent that the connecting as well as the interrupting of the connection, exclusively magnetically accomplished do not include any relative movements between the conducting elements between which an electric potential differential might exist, and as well it will be apparent that the improved lamp does not include any external electroconducting elements, moving components anyhow passing through the waterproof casing or other elements which may give rise to discontinuities or other drawbacks.

It is also apparent that, although the invention has been described as a waterproof and flameproof lamp for emergency duties, the above-disclosed inventive concepts and the technical approaches resulting therefrom can be conveniently adapted for different uses requiring the observance of like or similar duty conditions, and the lamp can be as well provided in many different forms and according to other construction approaches, without departing from the scope of the present invention.

What is claimed is:

1. A portable electric emergency lamp comprising a casing, a light source, a self-contained power supply constituted by a rechargeable battery in the casing, a transformer, a first winding of the transformer being associated with the lamp casing and connected to the battery, the second winding being detachable from the casing, a first electric circuit connected to the battery and connectable to the first winding for battery recharge and a second electric circuit controllable from the outside to connect the light source to the battery, the second winding being connectable to an external AC supply, said transformer comprising an electric magnetoinductively operating power transducer, said transformer windings being each associated with an armature section, the two armature sections jointly forming the magnetic circuit when the surfaces of said supply head and casing are caused to touch.

2. A lamp as in claim 1, including normally open switching means in circuit with one of said windings and magnetically biasable, and permanent magnet means carried by the part carrying the other winding to bias said switching means to closed position.

3. Improved lamp as in claim 2, comprising a movable handle formed as a waterproof casing carrying said second winding, said permanent magnet means being incorporated in said lamp casing.

4. The improved lamp as in claim 1, wherein a capacitor is connected in series to the electric circuit of the primary winding, said capacitor forming in conjunction with the impedance of said electric circuit an LC circuit for limiting the current absorption of the primary winding when moved away from the secondary winding.

* * * * *